(12) United States Patent
Sheng et al.

(10) Patent No.: US 10,715,698 B1
(45) Date of Patent: Jul. 14, 2020

(54) SYSTEM AND METHOD FOR PROCESSING DOCUMENTS USING MOBILE PAYMENT TO INSTANTLY ACTIVATE PRIVILEGE

(71) Applicant: AVISION INC., Hsinchu (TW)

(72) Inventors: Shih-Chao Sheng, Hsinchu (TW); Chen-Chang Li, Hsinchu (TW); Po-Sheng Shih, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/283,154

(22) Filed: Feb. 22, 2019

(30) Foreign Application Priority Data

Jan. 2, 2019 (TW) .............................. 108100068 A (51) Int. Cl.
*H04N 1/34* (2006.01)
*G06F 21/36* (2013.01)
*G06Q 20/32* (2012.01)
*H04N 1/00* (2006.01)

(52) U.S. Cl.
CPC ............. *H04N 1/346* (2013.01); *G06F 21/36* (2013.01); *G06Q 20/3276* (2013.01); *H04N 1/00779* (2013.01); *H04N 1/344* (2013.01); *H04N 2201/0094* (2013.01)

(58) Field of Classification Search
CPC .... H04N 1/346; H04N 1/00779; H04N 1/344; H04N 2201/0094; G06F 21/36; G06Q 20/3276
USPC ........................... 358/1.15, 1.9, 1.16, 426.04
See application file for complete search history.

(56) References Cited

U.S. PATENT DOCUMENTS

2009/0112768 A1* 4/2009 Hammad ............. G06Q 10/087
705/44
2011/0313917 A1* 12/2011 Lawson ............... G06Q 20/102
705/40

FOREIGN PATENT DOCUMENTS

| CN | 104408626 A | 3/2015 |
| CN | 105378776 A | 3/2016 |
| CN | 108346241 A | 7/2018 |
| CN | 109189350 A | 11/2019 |
| TW | M563003 U | 7/2018 |

* cited by examiner

*Primary Examiner* — Quang N Vo
(74) *Attorney, Agent, or Firm* — Schmeiser, Olsen & Watts, LLP (57) ABSTRACT

A system and a method for processing documents using mobile payment to instantly activate privilege are provided with a mobile device, a cloud server, a proxy server and a document-processing device connected to a network. Users can hold the mobile device to approach the document-processing device to perform corresponding operation in generation of a setting of parameters. The cloud server acquires the setting of parameters through the network and transmits the setting of parameters to the proxy server in exchange for dedicated pictogram authentication information. The document-processing device provides pictogram information according to the pictogram authentication information. The mobile device performs and completes a payment procedure according to the pictogram information. The cloud server then instantly transmits an execution command to drive the document-processing device so as to enhance operational convenience and efficiency.

20 Claims, 10 Drawing Sheets

SYSTEM AND METHOD FOR PROCESSING DOCUMENTS USING MOBILE PAYMENT TO INSTANTLY ACTIVATE PRIVILEGE

BACKGROUND OF THE INVENTION

1. Field of the Invention

The present invention relates to a system and a method for processing documents and, more particularly to, a system and a method for processing documents using mobile payment to instantly activate privilege.

2. Description of the Related Art

By and large, no matter how developed or less developed a region is, office environments, government organizations, public places, schools, and stores therein are all usually equipped with document-processing equipment which may be a scanner, a printer, a multi-functional peripheral (MFP) and the like sharable with the general public.

Although the document-processing equipment is mainly provided as a convenient service, most of the document-processing equipment except those for private or personal use requires users to pay and the way of payment involved is not convenient enough. For instance, schools and stores are accustomed to payment in cash and using stored-value cards, which is involved with more labor cost and also not convenient to users. Some schools even request students to open dedicated accounts for payment, which are only accessible to students who open the accounts, and there is no way to withdraw money from other accounts but the dedicated accounts. The dedicated accounts that not only consume significant time for the account-opening process but restrict the use by others are still inconvenient and inefficient.

Moreover, convenient stores in currently-developed and densely populated countries are everywhere in urban areas, and each convenience store normally has the document-processing equipment and additional multimedia computer equipment accompanying therewith. After users are done with the use of the document-processing equipment, the multimedia computer equipment responsible for billing outputs a payment slip for users to stand in line and pay at the checkout counter. However, it would be rather inconvenient when users are not able to pay because of no money with them. Besides, if users do not pay on purpose, it is hard for the convenience stores to handle such situation.

If the document-processing equipment is installed in cross-district offices, government organizations, public places and the like, the equipment providers of the document-processing equipment located in different districts could be different, adding that under the circumstance of different consumables, mechanical parts, and operational cost involved with different types of document-processing equipment used in neighboring districts and maintained by different service providers, levels of service charge may also vary from service provider to service provider. From the perspective of users or managers for using or managing the various types of document-processing equipment, it could be troublesome to take care of payment and billing for multiple different types of document-processing equipment at higher management cost.

SUMMARY OF THE INVENTION

An objective of the present invention is to provide a system and a method for processing documents using mobile payment to instantly activate privilege, which utilize networking techniques for information exchange to get authorized by financial payment companies and generate corresponding pictogram information for users to use mobile phones to pay according to the pictogram information and instantly own the privilege of using the document-processing device, thereby enhancing users' operational convenience and efficiency in using the document-processing device.

To achieve the foregoing objective, the method for processing documents using mobile payment to instantly activate privilege is performed by a system including a mobile device and a document-processing device connected to a remote end through a network, and the method includes steps of:

the mobile device providing a setting of parameters to the remote end for the remote end to generate dedicated pictogram authentication information according to the setting of parameters, and the document-processing device providing pictogram information according to the pictogram authentication information;

the mobile device performing a payment procedure according to the pictogram information; and when the payment procedure is completed, the remote end instantly transmitting an execution command to drive the document-processing device to perform a corresponding document-processing action.

According to the foregoing steps, a user can hold the mobile device to approach the document-processing device to operate and provide the setting of parameters, and the remote end transmits the pictogram authentication information to the document-processing device in exchange for the setting of parameters for the document-processing device to provide the pictogram information. When the user holds the mobile device to complete the payment procedure according to the pictogram information, the remote end instantly transmits an execution command to the document-processing device to drive the document-processing device to perform a corresponding document-processing action so as to enhance operational convenience and efficiency.

To achieve the foregoing objective, a system for processing documents using mobile payment to instantly activate privilege includes at least one mobile device, at least one document-processing device, a proxy server, and a cloud server.

Each of the at least one document-processing device is connected to a network.

The proxy server is located at a remote end and is connected to the mobile device through the network.

The cloud server is located at the remote end and performs information exchange with the at least one document-processing device and the proxy server through the network.

Each of the at least one document-processing device transmits a setting of parameters to the cloud server, the cloud server transmits the setting of parameters to the proxy server in exchange for dedicated pictogram authentication information for the document-processing device to provide pictogram information according to the pictogram authentication information, a corresponding mobile device performs a payment procedure according to the pictogram information, and when the payment procedure is completed, the cloud server instantly transmits an execution command to drive the document-processing device to perform a corresponding document-processing action.

Given the foregoing system, at least one user can hold the respective mobile device to approach corresponding document-processing device to perform corresponding operation and transmit the setting of parameters to the cloud server through the corresponding document-processing device. The cloud server transmits the setting of parameters to the proxy server in exchange for dedicated pictogram authentication information and transmits the pictogram authentication information to the corresponding document-processing device for the corresponding document-processing device to provide the pictogram information to the respective mobile device according to the pictogram authentication information. After the at least one user holds the respective mobile device to complete the payment procedure according to the pictogram information, the cloud server instantly transmits an execution command to drive the corresponding document-processing device to perform a corresponding document-processing action so as to enhance users' operational convenience and efficiency.

Other objectives, advantages and novel features of the invention will become more apparent from the following detailed description when taken in conjunction with the accompanying drawings.

DETAILED DESCRIPTION OF THE INVENTION

Figure 1A:
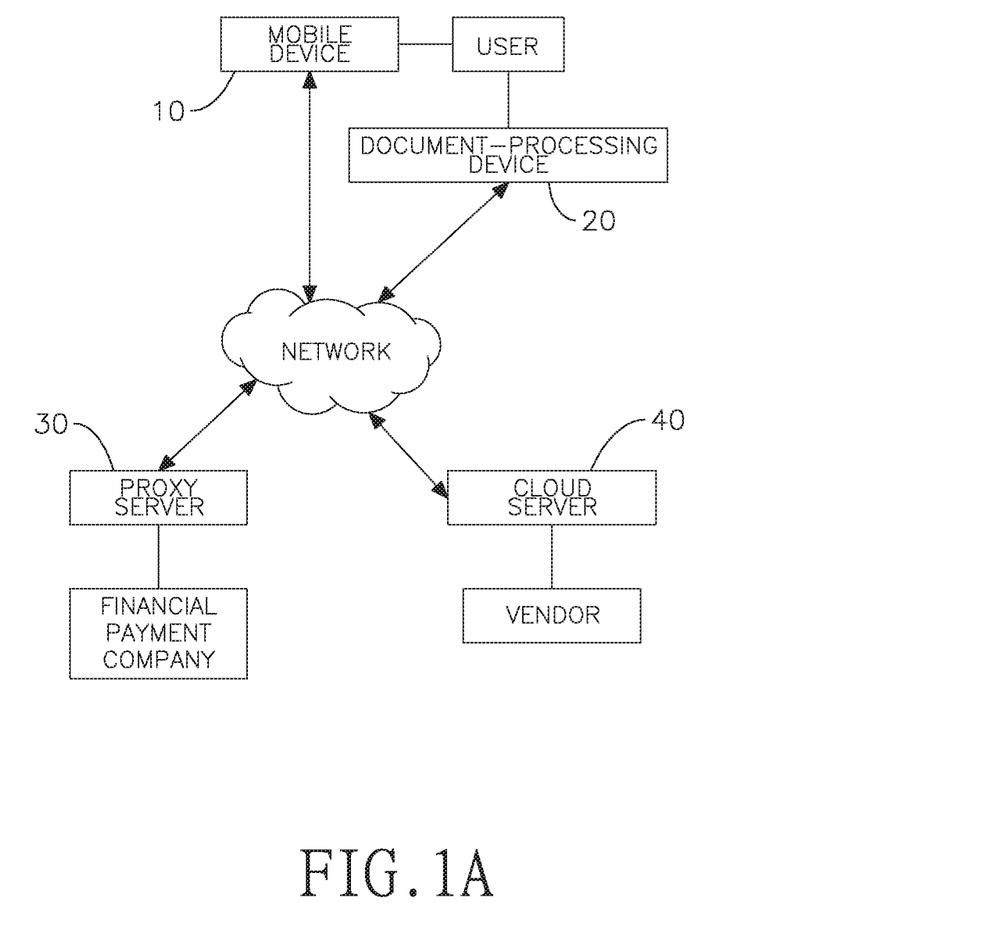
FIG. 1A is a functional block diagram showing one type of system architecture of a first embodiment of a system for processing documents using mobile payment to instantly activate privilege in accordance with the present invention.
Figure 1B:
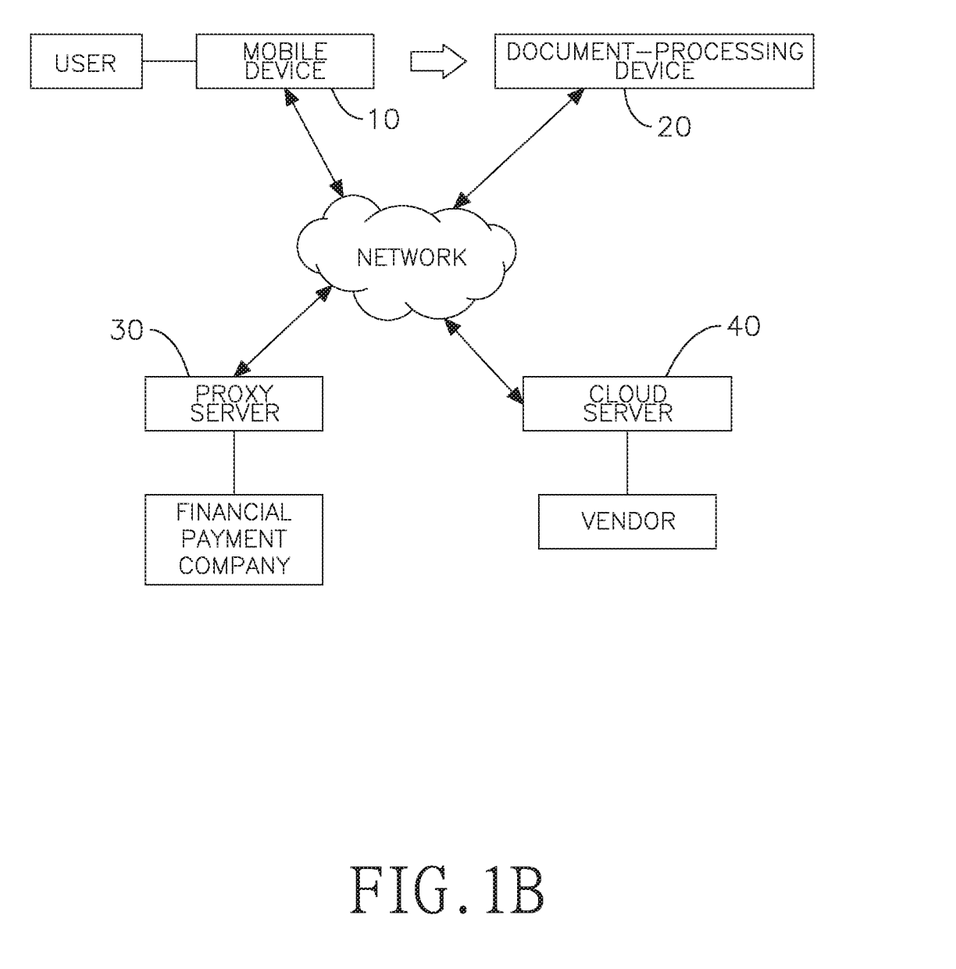
FIG. 1B is a functional block diagram showing another type of system architecture of the system in FIG. 1A.

With reference to FIGS. 1A and 1B, a first embodiment of a system for processing documents using mobile payment to instantly activate privilege in accordance with the present invention includes a mobile device 10, a document-processing device 20, a remotely located proxy server 30, and a remotely located cloud server 40. The at least one document-processing device 20, the proxy server 30 and the cloud server 40 are connected to a network. The cloud server 40 is provided by a vendor. The cloud server 40, the document-processing device 20 and the proxy server 30 exchange information via the network. The proxy server 30 is provided by a financial payment and settlement company and is connected to the mobile device through the network for a payment process. In the present embodiment, a direct communication link between the mobile device 10 and the document-processing device 20 is established by way of a wireless means.

As illustrated in FIG. 1A for a printing mode, when a user operates the mobile device to modify a configuration corresponding to the document-processing device 20 to provide a setting of parameters, the set of parameters can be directly performed by the document-processing device 20. In the present embodiment, the way of modifying the configuration to provide the set of parameters may be applied to perform a document mode, a certificate mode, or a mobile printing mode as shown in FIG. 1B. After the configuration is modified in the mobile device 10 of the user, the setting of parameters is generated. In the present embodiment, the way of modifying the configuration to provide the set of parameters may be further applied to perform a mobile interface mode.

With further reference to FIG. 1A, in the document mode, the document-processing device 20 receives document information representative of a document placed therein, and in the certificate mode, the document-processing device 20 receives certificate information representative of a certificate placed therein. Then, the user further inputs the number of copies and a printing format on the document-processing device 20, and generates a scanned document image or certificate image to complete configuration of the setting of parameters. Furthermore, with further reference to FIG. 1B, the mobile interface mode is directly operated on the mobile device 10 by the user to build up a direct link with the document-processing device 20. The user directly sends another document information, another number of copies, and another printing format to the document-processing device 20 through the mobile device 10 to complete configuration of the setting of parameters.

After completing configuration of the setting of parameters, the document-processing device 20 transmits the setting of parameters to the cloud server 40. The cloud server 40 transmits the setting of parameters to the proxy server 30 in exchange for dedicated pictogram authentication information, such that the document-processing device 20 provides pictogram information according to the pictogram authentication information. The mobile device 10 further performs a payment procedure according to the pictogram information. After the payment procedure is done, the cloud server 40 instantly transmits an execution command to the document-processing device 20 for storage. The document-processing device 20 is driven according to the execution command to perform a corresponding document-processing action.

Furthermore, when the cloud server 40 receives the setting of parameters and transmits an information feedback request to the proxy server 30 according to the setting of parameters, the proxy server 30 authenticates the information feedback request and then transmits back the pictogram authentication information to the cloud server 40 for the cloud server 40 to generate the pictogram information according to the pictogram authentication information and transmit the pictogram information to the document-processing device 20. Alternatively, the cloud server 40 first transmits the pictogram authentication information to the document-processing device 20 for the document-processing device 20 to generate the pictogram information. Given the foregoing approach, the security and veracity of information can be enhanced. In the present embodiment, the pictogram authentication information may include multiple character strings to increase information processing efficiency.

The setting parameters further include a set of billing parameters. After finishing the foregoing setting of parameters, the document-processing device 20 further generates the set of billing parameters according to the document information, the number of copies and the printing format in the setting of parameters and transmits the set of billing parameters to the cloud server 40. The cloud server 40 further sends the set of billing parameters to the proxy server 30 in exchange for the pictogram authentication information. In the present embodiment, the set of billing parameters includes parameters of a size, a quantity of copies, a color, and one-sided/two-sided copy.

In the present embodiment, the document-processing device 20 is one of a multi-functional peripheral (MFP), an intelligent copier, an intelligent fax machine and an intelligent printer which is an electronic device required to process an image of another paper medium or an external image. The corresponding document-processing action includes a print-out procedure, a scan procedure, a fax procedure or an image-processing procedure, such as post-processing.

Alternatively, the document-processing device 20 is an image-fetching device 20'. The image-fetching device 20' is one of an intelligent camera, a document camera, a video camera, or a headshot machine to catch an environment or an image in front of the lens. The corresponding information-processing action includes a print-out procedure, an image-fetching procedure, a typesetting procedure or an image processing procedure, such as post-processing.

Figure 2:
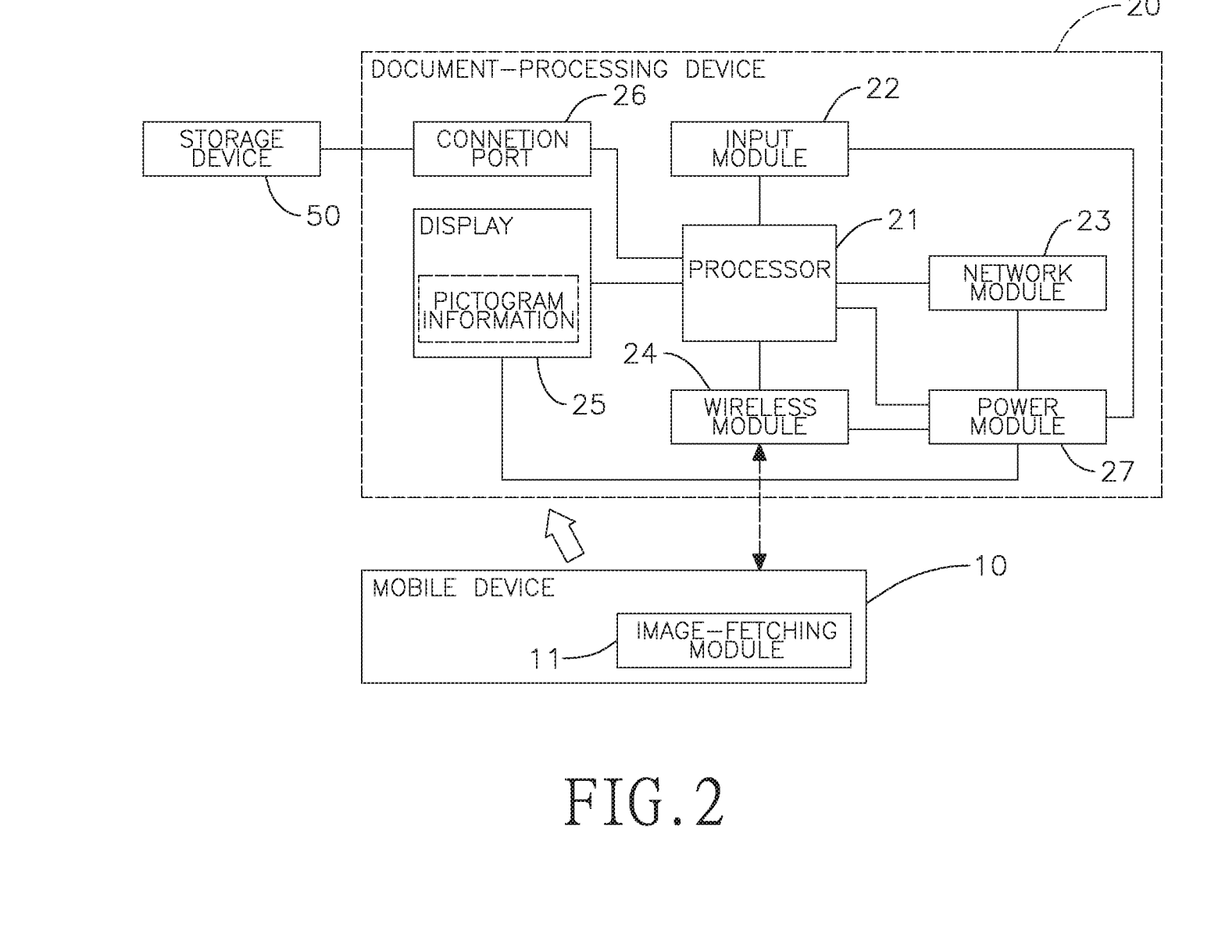
FIG. 2 is a partial functional block diagram showing the system in FIG. 1A or 1B.

With further reference to FIG. 2, the mobile device 10 includes an image-fetching module 11. After the image-fetching module 11 acquires the pictogram provided by the document-processing device 20, the mobile device 10 scans and analyzes the pictogram information and communicates with the proxy server 30 through the network to complete the payment procedure. When confirming the payment procedure is successfully completed, the proxy server 30 transmits a notification message to the cloud server 40 to confirm that the user has completed payment.

In the present embodiment, the pictogram information indicates a payment mark, which is constituted by a set of characters, a one-dimensional barcode, a two-dimensional barcode or a QR code to have more adequate amount of information and practicability.

The document-processing device includes a processor 21, an input module 22, a network module 23, a wireless module 24, a display 25, a connection port 26, and a power module 27. The processor 21 is electrically connected to the input module 22, the network module 23, the wireless module 24, the display 25, the connection port 26, and the power module 27. The power module 27 is electrically connected to the input module 22, the network module 23, the wireless module 24, and the display 25. The input module 22 is provided for users to input the setting of parameters, such as the number of copies, the printing format, and the like. The network module 23 serves to connect to the network. The wireless module 24 establishes a connection link with the mobile device 10 through a communication protocol. In the present embodiment, the communication protocol includes a wireless communication protocol or a mobile printing protocol. By virtue of wireless data transmission through the wireless communication protocol or the mobile printing protocol, a standard of using mobile output to print out data can be met. Specifically, the wireless communication protocol further includes a wireless communication standard, such as a WiFi (Wireless Fidelity) Direct protocol or a Bluetooth protocol to constitute network linking techniques for building up an environment of a local area network (LAN) or a peer to peer network. The mobile printing protocol further includes a standard of using mobile output to print out data, such as an AirPrint protocol, an ePrint protocol, or a Mopria protocol. The display 25 serves to display and provide the foregoing pictogram information for the image-fetching module 11 of the mobile device 10 to take and fetch an image.

The connection port 26 of the document-processing device 20 is connected to an external storage device 50. Users can store the document information and the certificate information in the storage device 50. When users connect the storage device 50 with the connection port 26, the processor 21 of the document-processing device 20 receives the document information or the certificate information along with the number of copies and the printing format provided through the document-processing device 20 or the mobile device 10 to complete the setting of parameters. Given the connection port 26 additionally installed to connect with the storage device 50, users' operational convenience can be further enhanced.

Figure 3:
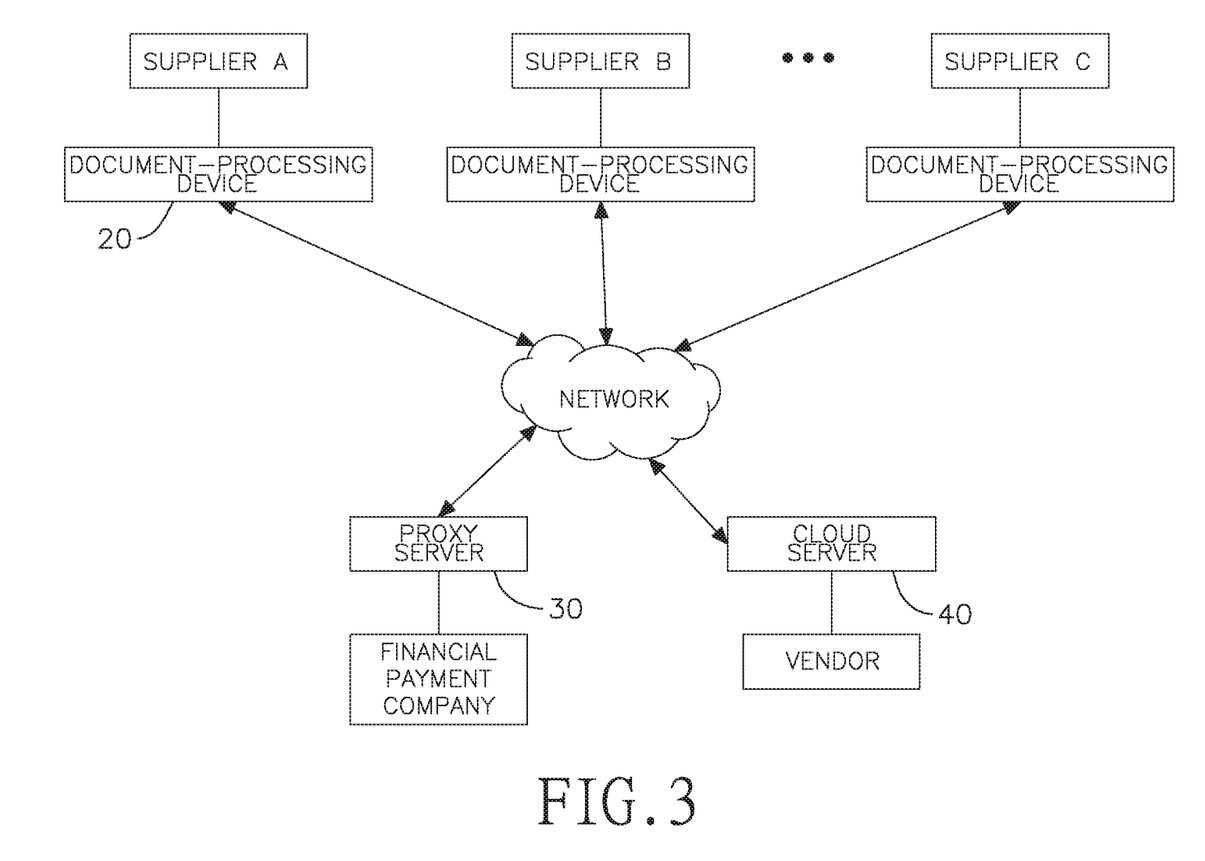
FIG. 3 is a functional block diagram showing system architecture of a second embodiment of a system for processing documents using mobile payment to instantly activate privilege in accordance with the present invention.

With reference to FIG. 3, a second embodiment of a system for processing documents using mobile payment to instantly activate privilege in accordance with the present invention includes multiple document-processing devices 20 which are located at different districts, such as cross-district offices, government organizations, public places and the like. When the multiple document-processing devices 20 are provided by different suppliers A, B, C, the consumables, mechanical parts and shipping costs are all different and the resultant payment schemes are all different. In the present embodiment, each document-processing device 20 is connected to a cloud server 40 of a corresponding supplier responsible for management through the network. When any one of the multiple document-processing devices 20 transmits the setting of parameters to the proxy server 30 in exchange for dedicated pictogram authentication information via the cloud server 40 (i.e. each of the multiple document-processing devices 20 provided by the suppliers A, B, C has its own pictogram authentication information), the cloud server 40 further transmits the pictogram authentication information to a corresponding document-processing device 20. After users are done with the payment procedure, the cloud server 40 instantly transmits the execution command to the corresponding document-processing device 20 to drive the corresponding document-processing device 20 to perform a corresponding action. Meanwhile, the cloud server 40 can intervene with the multiple document-processing devices from differ suppliers A, B, C to take care of payment, operation conditions, and status of consumables so as to increase the convenience of managers and reduce management cost.

Figure 4:
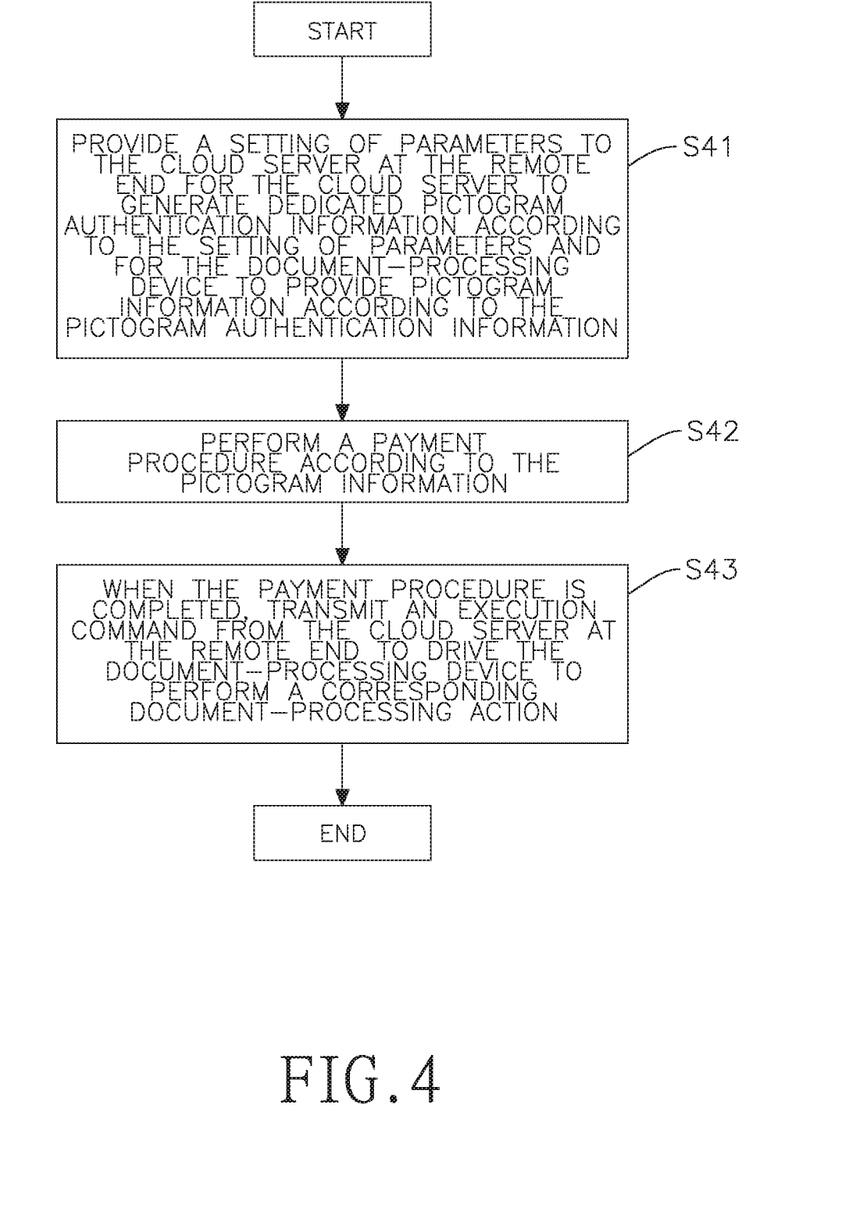
FIG. 4 is a flow diagram of a method for processing documents using mobile payment to instantly activate privilege in accordance with the present invention.

From the foregoing embodiments and applications, a method for processing documents using mobile payment to instantly activate privilege can be deduced. The method is performed by the foregoing system with the mobile device 10 and the document-processing device 20 connected to a remote end, which is constituted by the proxy server 30 and the cloud server 40, through the network, and includes the following steps.

Step S41: Provide a setting of parameters to the cloud server 40 at the remote end through the mobile device 10 for the cloud server 40 to generate dedicated pictogram authentication information according to the setting of parameters and for the document-processing device 20 to provide pictogram information according to the pictogram authentication information. The setting of parameters may be directly edited and configured at the document-processing device 20 or may be edited and configured at the mobile device 10. When configurations of the setting of parameters are completed, the document-processing device 30 transmits the setting of parameters to the cloud server 40 at the remote end.

Step S42: Perform a payment procedure according to the pictogram information through the mobile device 10.

Step S43: When the payment procedure is completed, transmit an execution command from the cloud server 40 at the remote end to drive the document-processing device 20 to perform a corresponding document-processing action.

Figure 5:
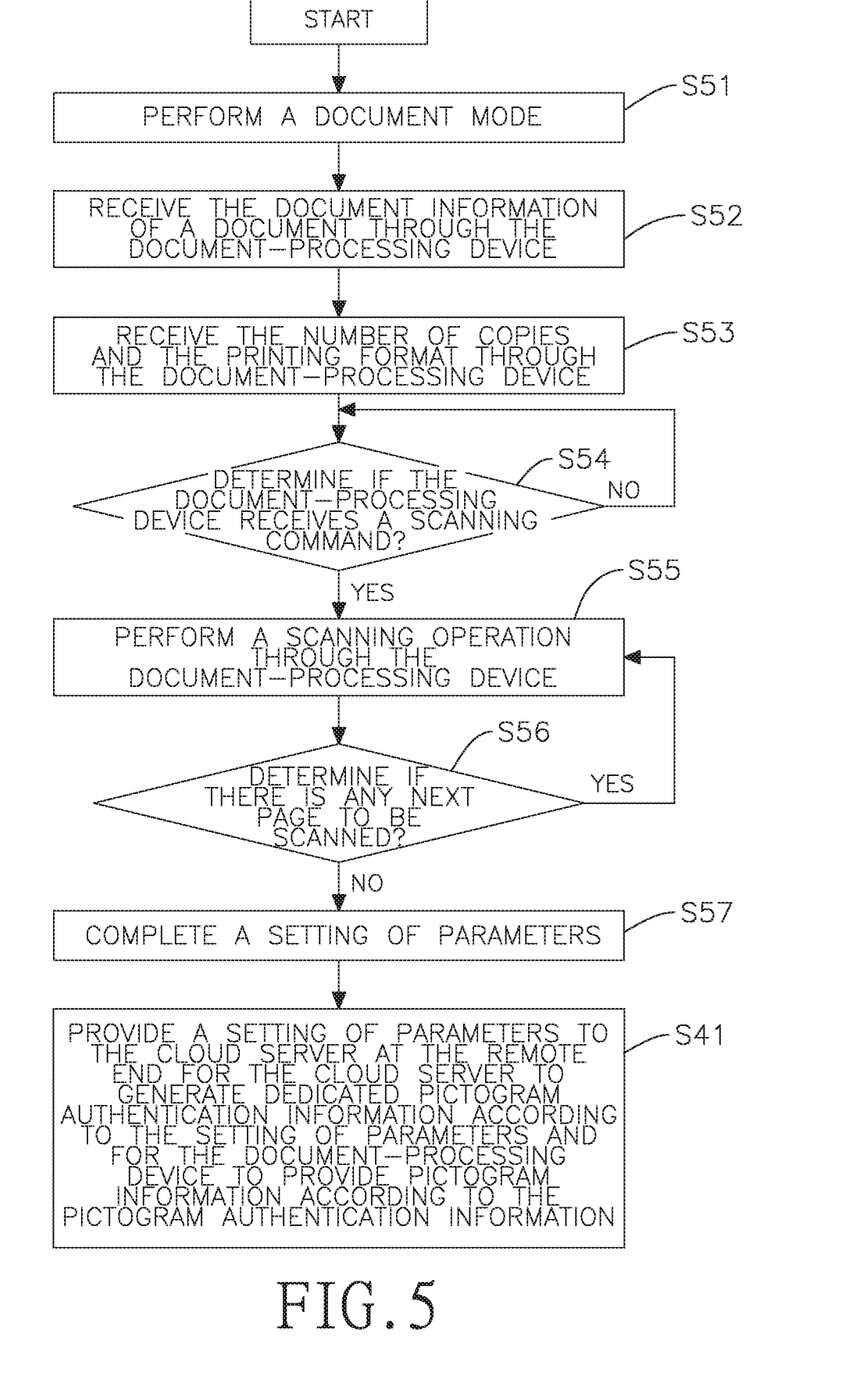
FIG. 5 is a flow diagram of a document mode of the method in FIG. 4.

With reference to FIG. 5, the method further includes a document mode applicable to configuration of copying document information and includes the following steps.

Step S51: Perform a document mode through the document-processing device 20.

Step S52: Receive the document information of a document placed in the document-processing device 20 through the document-processing device 20.

Step S53: Receive the number of copies and the printing format through the document-processing device 20.

Step S54: Determine if the document-processing device 20 receives a scanning command. When the document-processing device 20 receives the scanning command, perform step S55. Otherwise, resume step S54.

Step S55: Perform a scanning operation through the document-processing device 20.

Step S56: Determine if there is any next page to be scanned according to the document information through the document-processing device 20. When there is a page to be scanned, resume step S55. Otherwise, perform step S57.

Step S57: Complete a setting of parameters according to the scanned document information, the number of copies, and the printing format.

After step S57 is done, subsequently perform the foregoing step S41.

Figure 6:
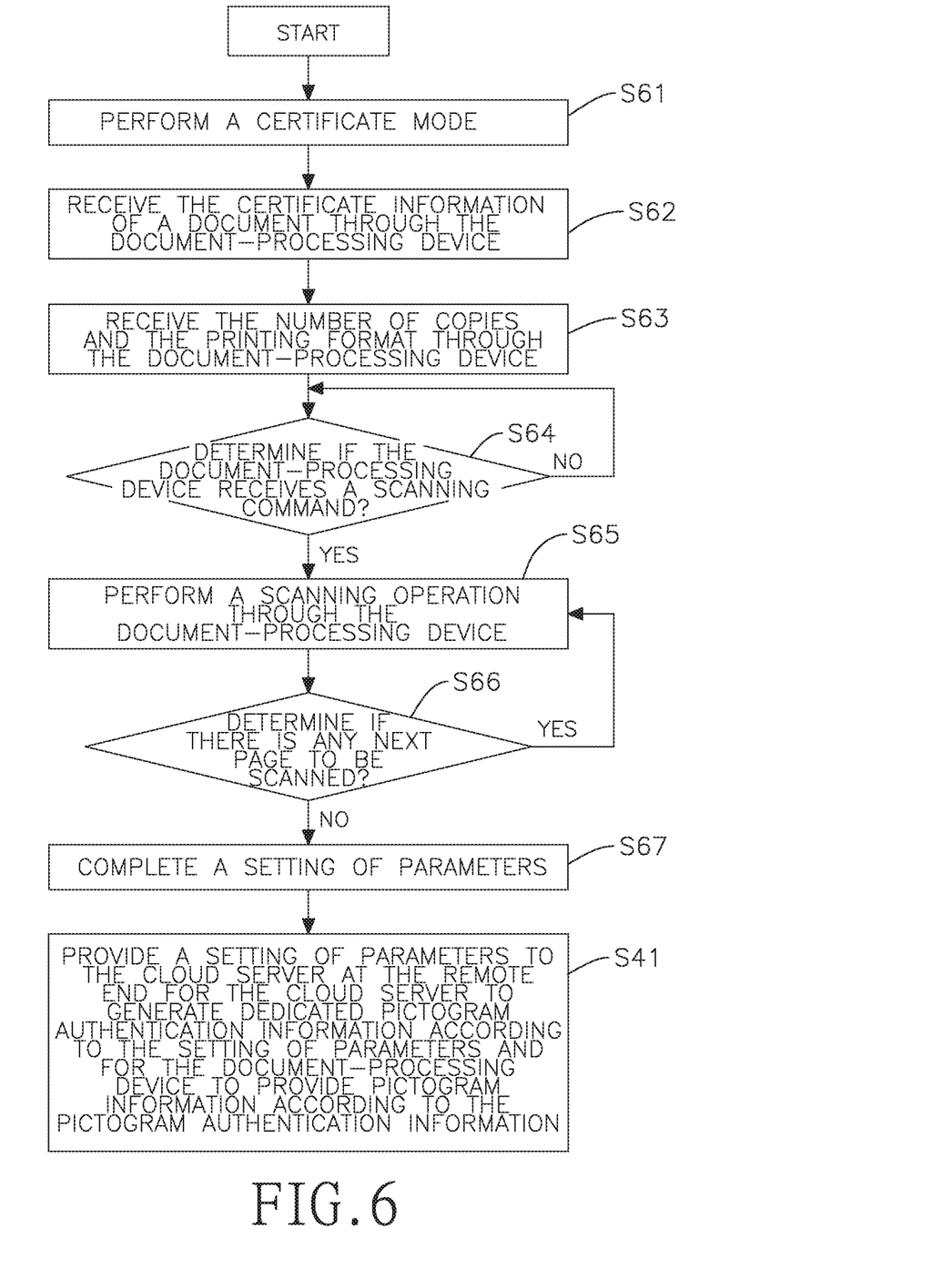
FIG. 6 is a flow diagram of a certificate mode of the method in FIG. 4.

Furthermore, with reference to FIG. 6, the method further includes a certificate mode applicable to configuration of copying document information and includes the following steps.

Step S61: Perform a certificate mode through the document-processing device 20.

Step S62: Receive the certificate information of a certificate placed in the document-processing device 20 through the document-processing device 20.

Step S63: Receive the number of copies and the printing format through the document-processing device 20.

Step S64: Determine if the document-processing device 20 receives a scanning command through the document-processing device 20. When the document-processing device 20 receives the scanning command, perform step S65. Otherwise, resume step S64.

Step S65: Perform a scanning operation through the document-processing device 20.

Step S66: Determine if there is any next page to be scanned according to the certificate information through the document-processing device 20. When there is a page to be scanned, resume step S65. Otherwise, perform step S67.

Step S67: Complete a setting of parameter according to the scanned certificate information, the number of copies, and the printing format.

After step S67 is done, subsequently perform the foregoing step S41.

Figure 7:
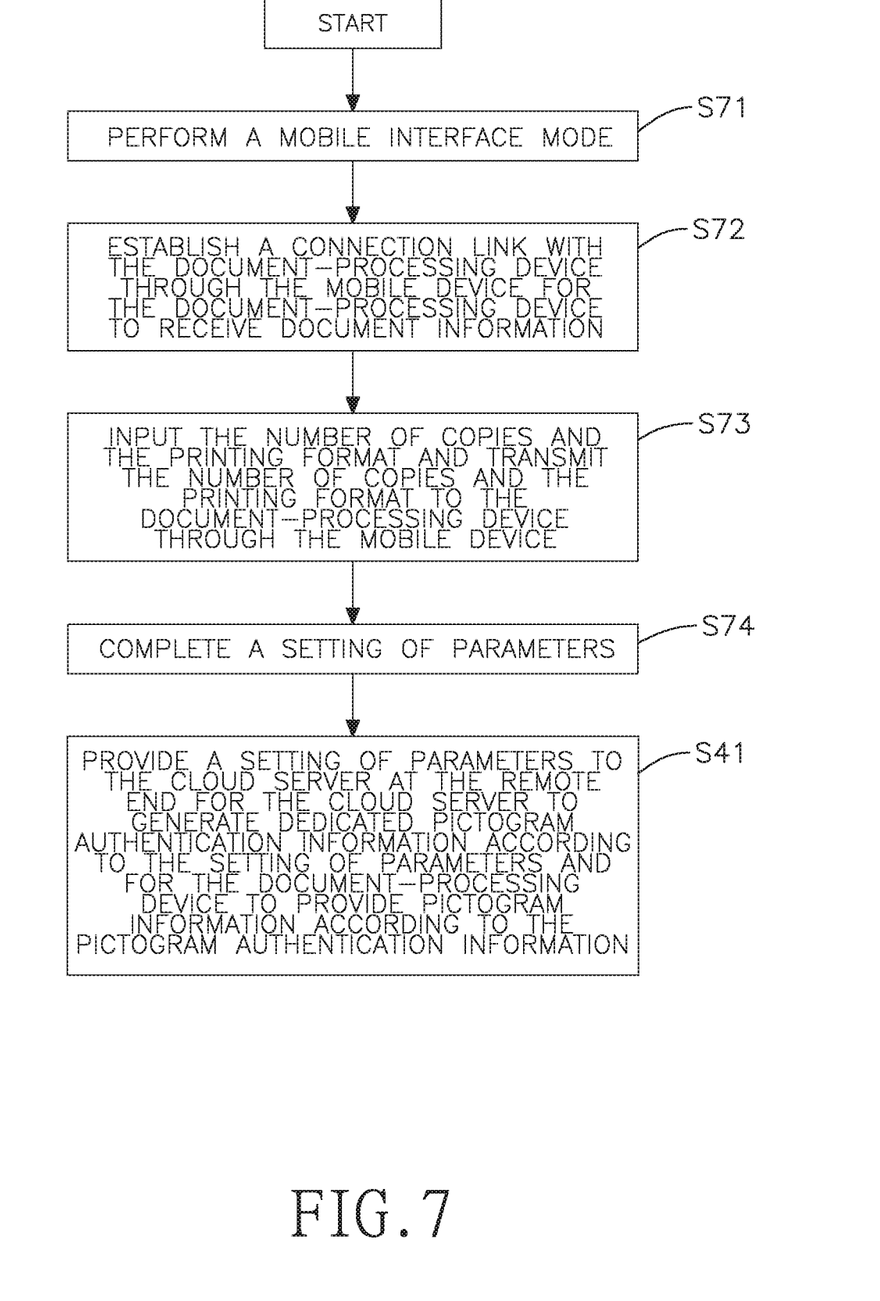
FIG. 7 is a flow diagram of a mobile interface mode of the method in FIG. 4.

With reference to FIG. 7, the method further includes a mobile interface mode applicable to configuration for mobile printing and includes the following steps.

Step S71: Perform a mobile interface mode through the mobile device 10.

Step S72: Establish a connection link with the document-processing device 20 through the mobile device 20 using a communication protocol for the document-processing device 20 to receive another document information. In the present embodiment, said another document information includes document and image formats, such as DOC, PDF, JPG, and the like, and the communication protocol includes a wireless communication protocol and a mobile printing protocol for wireless data communication to be performed through the wireless communication protocol and for a standard of using mobile output to print out information to be met through the mobile printing protocol. Moreover, in the present embodiment, the wireless communication protocol further includes wireless communication standards, such as a LAN protocol, an AirPrint protocol, a Bluetooth protocol and a WiFi protocol. The mobile printing protocol further includes relevant techniques using mobile output to print out data, such as an AirPrint protocol, an ePrint protocol, and a Mopria protocol.

Step S73: Input another number of copies and another printing format and transmit said another number of copies and said another printing format to the document-processing device 20 through the mobile device 10.

Step S74: Complete another setting of parameters according to said another document information, said another number of copies and said another printing format through the document-processing device 20.

After step S74 is done, subsequently perform the foregoing step S41.

Figure 8:
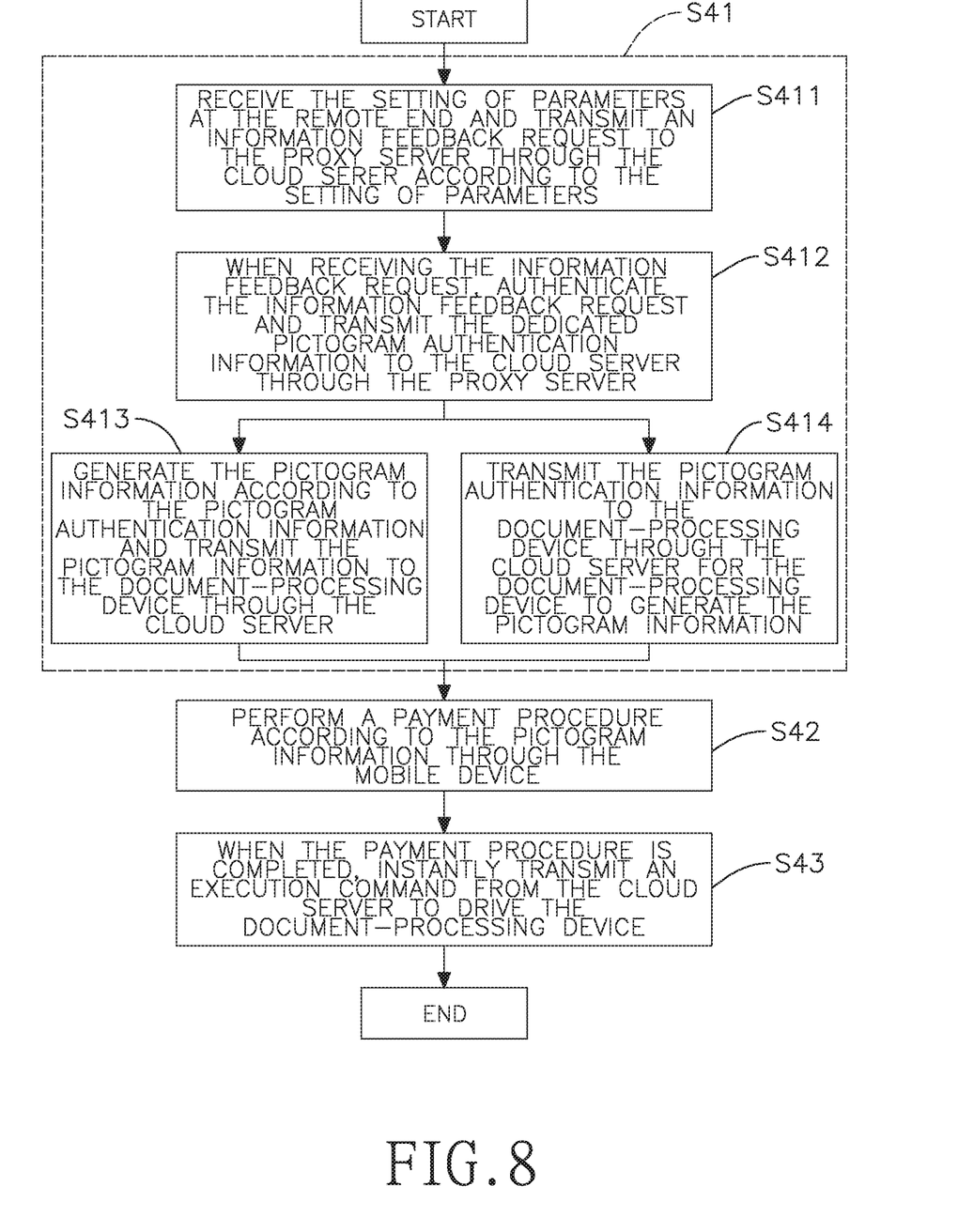
FIG. 8 is a flow diagram of a procedure of exchanging pictogram authentication information of the method in FIG. 4.

With reference to FIG. 8, step S41 further includes the following steps.

Step S411: Receive the setting of parameters at the remote end and transmit an information feedback request to the proxy server 30 at the remote end through the cloud server 40 according to the setting of parameters.

Step S412: When the proxy server 30 receives the information feedback request, authenticate the information feedback request and transmit the dedicated pictogram authentication information to the cloud server 40 through the proxy server 30. In the present embodiment, the pictogram authentication information is constituted by a set of character strings.

Step S413: Generate the pictogram information according to the pictogram authentication information and transmit the pictogram information to the document-processing device 20 through the cloud server 40.

Step S414: Instantly transmit the pictogram authentication information to the document-processing device 20 through the cloud server 40 for the document-processing device 20 to generate the pictogram information. It is noted that only one of step S413 and step S414 can be alternatively performed. In the present embodiment, the pictogram information is constituted by QR code.

After step S414 is done, subsequently perform step S42.

Figure 9:
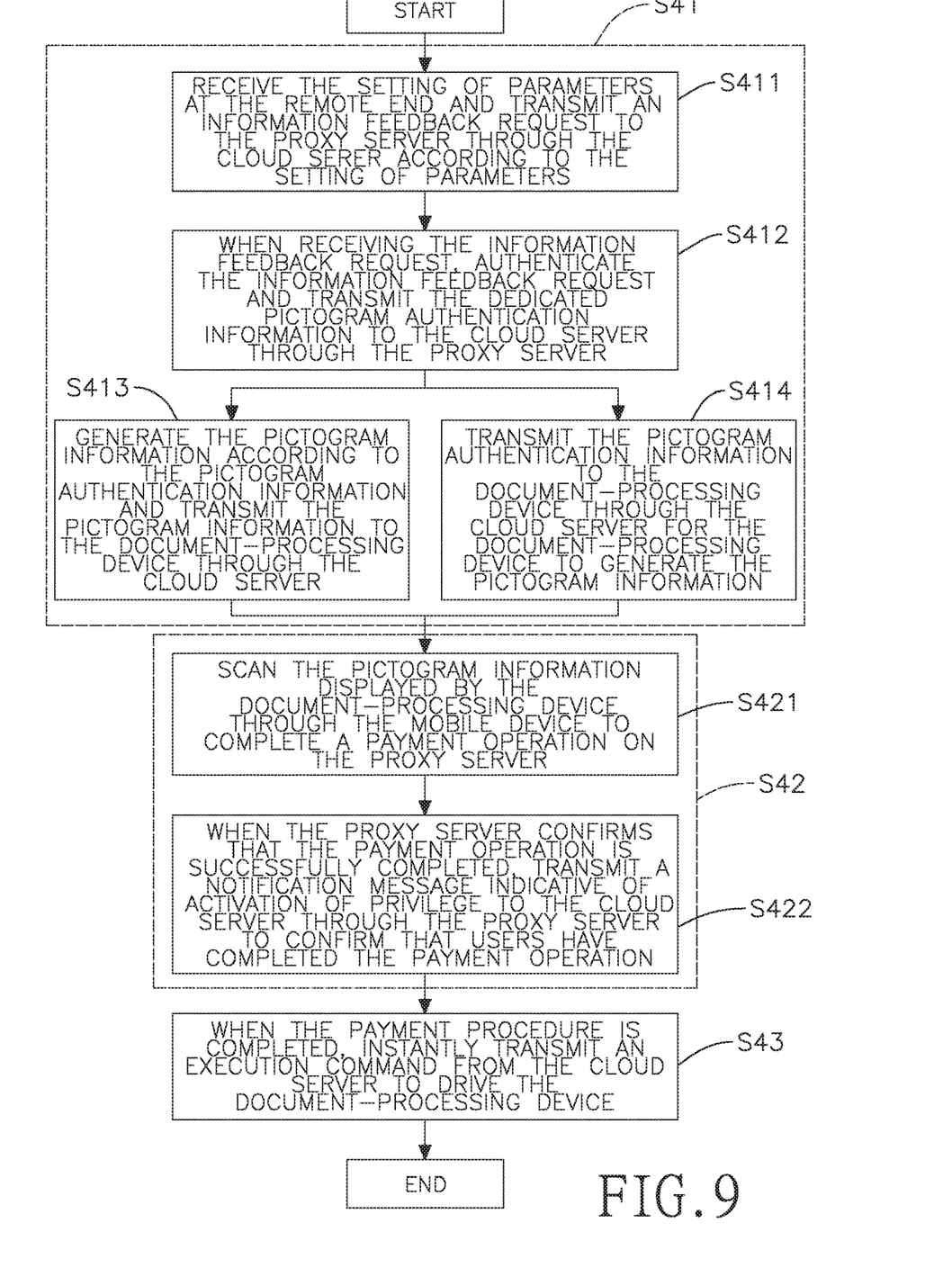
FIG. 9 is a flow diagram of a payment procedure of the method in FIG. 4.

The step S42 further includes the following steps.

Step S421: Scan the pictogram information displayed by the document-processing device 20 and analyze the pictogram information through the mobile device 10 to perform and complete a payment operation on the proxy server 30 according to the pictogram information.

Step S422: When the proxy server confirms that the payment operation is successfully completed, transmit a notification message indicative of activation of privilege to the cloud server 40 through the proxy server 30 to confirm that users have completed the payment operation.

After step S422 is done, subsequently perform step S43.

In sum, the present invention utilizes the mobile device 10, the document-processing device 20, the proxy server 30 and the cloud server 40 as well as networking techniques for information exchange to acquire the authorization of a financial payment company from the proxy server 30. The document-processing device 20 further displays corresponding pictogram information for users to just use the mobile device 10 to take the picture of the pictogram in completion of the payment procedure. Thus, the privilege of using the document-processing device 20 can be instantly activated to enhance operational convenience and efficiency upon using the document-processing device 20. Besides, when the multiple document-processing devices 20 are provided through different suppliers, from the perspective of the vendor providing the cloud server 40, the present invention can further increase manager's convenience and reduce management cost.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for processing documents using mobile payment to instantly activate privilege performed by a system including a mobile device and a document-processing device connected to a remote end through a network, the method comprising steps of:
    the mobile device providing a setting of parameters to the remote end for the remote end to generate dedicated pictogram authentication information according to the setting of parameters, and the document-processing device providing pictogram information according to the pictogram authentication information;
    the mobile device performing a payment procedure according to the pictogram information; and
    when the payment procedure is completed, the remote end instantly transmitting an execution command to drive the document-processing device to perform a corresponding document-processing action;
    wherein the pictogram information varies from configured parameter to configured parameter, and the pictogram information corresponds to the document-processing device; and
    wherein the document-processing action includes a print-out procedure, an image-fetching procedure, a typesetting procedure, or an image processing procedure.

2. The method as claimed in claim 1, wherein the setting of parameters is edited and configured at the document-processing device, and after the setting of parameters is completed, the document-processing device transmits the setting of parameters to the remote end.

3. The method as claimed in claim 1, wherein the setting of parameters is edited and configured at the mobile device, and after the setting of parameters is completed, the document-processing device transmits the setting of parameters to the remote end.

4. The method as claimed in claim 1, further comprising steps of:
    the document-processing device determining if a scanning command is received;
    when the scanning command is received, the document-processing device performing a scanning operation;
    the document-processing device determining if there is any next page to be scanned according to first scanned document information; and
    when there is no next page to be scanned, the document-processing device completing the setting of parameters according to the first scanned document information, a number of copies and a printing format.

5. The method as claimed in claim 4, wherein the step of the document-processing device determining if there is any next page to be scanned further comprises a step of resuming the step of the document-processing device performing the scanning operation.

6. The method as claimed in claim 1, further comprising steps of:
    the document-processing device performing a certificate mode to receive certificate information of a certificate placed therein, a number of copies, and a printing format;
    the document-processing device determining if a scanning command is received;
    when the scanning command is received, the document-processing device performing a scanning operation;
    the document-processing device determining if there is any next page to be scanned according to scanned certificate information; and
    when there is no next page to be scanned, the document-processing device completing the setting of parameters according to the scanned certificate information, the number of copies and the printing format.

7. The method as claimed in claim 1, further comprising steps of:
    the mobile device performing a mobile interface mode;
    the mobile device establishing a connection link with the document-processing device through a communication protocol for the document-processing device to receive another document information;
    the mobile device inputting another number of copies and another printing format and transmitting said another number of copies and said another printing format to the document-processing device; and
    completing another setting of parameters according to said another document information, said another number of copies, and said another printing format.

8. The method as claimed in claim 7, wherein said another document information is a type of document or image.

9. The method as claimed in claim 1, wherein the remote end includes a proxy server and a cloud server, and the step of the mobile device providing a setting of parameters to the remote end for the remote end to generate dedicated pictogram authentication information according to the setting of parameters, and the document-processing device providing pictogram information according to the pictogram authentication information further comprises steps of:
    the cloud server receiving the setting of parameters and transmitting an information feedback request to the proxy server according to the setting of parameter;
    when the proxy server receives the information feedback request, the proxy server transmitting the pictogram authentication information to the cloud server; and
    the cloud server generating the pictogram information according to the pictogram authentication information and transmitting the pictogram information to the document-processing device.

10. The method as claimed in claim 1, wherein the remote end includes a proxy server and a cloud server, and the step of the mobile device providing a setting of parameters to the remote end for the remote end to generate dedicated pictogram authentication information according to the setting of parameters, and the document-processing device providing pictogram information according to the pictogram authentication information further comprises steps of:

the cloud server receiving the setting of parameters and transmitting an information feedback request to the proxy server according to the setting of parameter;

when the proxy server receives the information feedback request, the proxy server transmitting the pictogram authentication information to the cloud server; and  the cloud server transmitting the pictogram information to the document-processing device for the document-processing device to generate the pictogram information.

11. The method as claimed in claim 1, wherein the pictogram authentication information is constituted by a set of character strings.

12. The method as claimed in claim 1, wherein the pictogram information is constituted by a QR code (Quick Response Code).

13. The method as claimed in claim 1, wherein the step of the mobile device performing a payment procedure according to the pictogram information further comprises steps of:

the mobile device scanning and analyzing the pictogram information displayed by the document-processing device to perform a payment operation on the proxy server; and  when the proxy server confirms that the payment operation is successfully completed, the proxy server transmitting a notification message indicative of activation of privilege to the cloud server.

14. A system for processing documents using mobile payment to instantly activate privilege, comprising:

at least one mobile device;

at least one document-processing device connected to a network;

a proxy server located at a remote end and connected to the at least one mobile device through the network; and  a cloud server located at the remote end and performing information exchange with the at least one document-processing device and the proxy server through the network;

wherein each of the at least one document-processing device transmits a setting of parameters to the cloud server, the cloud server transmits the setting of parameters to the proxy server in exchange for dedicated pictogram authentication information for the document-processing device to provide pictogram information according to the pictogram authentication information, a corresponding mobile device performs a payment procedure according to the pictogram information, and when the payment procedure is completed, the cloud server instantly transmits an execution command to drive the document-processing device to perform a corresponding document-processing action;

wherein the pictogram information varies from configured parameter to configured parameter, and the pictogram information corresponds to the document-processing device; and  wherein the document-processing action includes a print-out procedure, an image-fetching procedure, a typesetting procedure, or an image processing procedure.

15. The system as claimed in claim 14, wherein the pictogram authentication information is constituted by a set of character strings, and the pictogram information is constituted by a QR code (Quick Response Code).

16. The system as claimed in claim 14, wherein each of the at least one document-processing device is constituted by a multifunctional peripheral (MFP) or an intelligent printer, and the corresponding document-processing action includes a print-out procedure.

17. The system as claimed in claim 14, wherein each of the at least one document-processing device includes a wireless module establishing a connection link with a corresponding mobile device through a communication protocol, and the communication protocol includes a wireless communication protocol or a mobile printing protocol.

18. The system as claimed in claim 14, wherein the at least one document-processing device includes multiple document-processing devices, and each of the multiple document-processing devices is connected to the cloud server through the network and has dedicated pictogram authentication information.

19. The system as claimed in claim 14, wherein each of the at least one document-processing device further includes a connection port adapted to connect to a storage device for storing information therein beforehand.

20. A system for processing documents using mobile payment to instantly activate privilege, comprising at least one document-processing device connected to a remote end through a network;

wherein each of the at least one document-processing device transmits a setting of parameters to the remote end in exchange for dedicated pictogram authentication information for the document-processing device to provide pictogram information according to the pictogram authentication information, and when receiving an execution command instantly transmitted from the remote end, the document-processing device performs a corresponding document-processing action;

wherein the pictogram information varies from configured parameter to configured parameter, and the pictogram information corresponds to the document-processing device; and  wherein the document-processing action includes a print-out procedure, an image-fetching procedure, a typesetting procedure, or an image processing procedure.

* * * * *